(12) United States Patent
Martoch et al.

(10) Patent No.: US 7,325,951 B2
(45) Date of Patent: Feb. 5, 2008

(54) FRONT SIDE LIGHTING DEVICE

(75) Inventors: Jan Martoch, Hranice (CZ); Milan Cejnek, Novy Jicin (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/977,237

(22) Filed: Oct. 29, 2004

(65) Prior Publication Data
US 2005/0122733 A1 Jun. 9, 2005

(30) Foreign Application Priority Data
Oct. 30, 2003 (CZ) .................... 2003-2955

(51) Int. Cl.
*B60Q 1/00* (2006.01)
(52) U.S. Cl. ........................ 362/464; 315/79
(58) Field of Classification Search ................ 362/543, 362/464, 544, 545, 466–467; 315/81, 79
See application file for complete search history.

(56) References Cited
U.S. PATENT DOCUMENTS 6,293,686 B1 * 9/2001 Hayami et al. ............. 362/465
6,578,993 B2 * 6/2003 Kobayashi et al. ......... 362/466
6,676,282 B2 * 1/2004 Begemann et al. ......... 362/543
2001/0012206 A1 8/2001 Hayami et al.

FOREIGN PATENT DOCUMENTS

| CZ | 2039-95 | 2/1998 |
| DE | 41 22 531 C2 | 6/2001 |
| GB | 2275764 A * | 7/1994 |
| GB | 2 276 441 A | 9/1994 |
| WO | WO 94/09310 | 4/1994 |

* cited by examiner

*Primary Examiner*—Thomas M. Sember
*Assistant Examiner*—Julie A. Shallenberger
(74) *Attorney, Agent, or Firm*—Brinks Hofer Gilson & Lione

(57) ABSTRACT

Front side lighting device for motor vehicles is placed on both sides of the front of the vehicle. The device includes a compact reflector and a light source whose light beam is asymmetrical, with an angle ($\beta$) of an outer spread being greater than angle ($\alpha$) of an inner spread. The device is activated either on both sides of the vehicle, in the case of low visibility, or only on the left or right side of the vehicle, during curve driving and/or turning. The side of activation is given by a steering wheel angle or by a turn signal switch and lighting mode is controlled by a speed sensor of the vehicle.

10 Claims, 3 Drawing Sheets

FRONT SIDE LIGHTING DEVICE

FIELD OF THE INVENTION

The present invention relates to a motor vehicle lighting unit with an asymmetrical light distribution of the intensity, such that the front-side space of the motor vehicle is illuminated.

BACKGROUND

Currently, lighting devices for illumination of the front-side space of a motor vehicle utilize either the mechanical rotation of the reflectors or a multi-chamber system.

SUMMARY

The front side lighting device of the present invention works as a supplement to a low beam or a high beam and improves the level of illumination of the front-side space of the motor vehicle. This device works in two light modes, a global mode and a side mode.

In the global mode, the front side lighting devices on both sides of the motor vehicle work together and at the same time with a low beam or a high beam. In this lighting mode, the front side lighting device is turned on in any situation with low visibility, due to fog, rain, heavy snow, etc., similar to the operation of a front fog lamp.

In the side mode, the front side lighting device on only one side of the vehicle works together with the low beam or the high beam. The side of activation of the front side lighting determined by the steering wheel angle or the turn signal switch. This lighting mode may also be controlled by the speed sensor of the vehicle.

In a preferred embodiment according to the present invention, a front side lighting device for motor vehicles is provided on both sides of the front of the vehicle. The lighting device includes a reflector and light source whose light beam is asymmetrical and the angle β of outer spread is greater than the angle α of the inner spread. The lighting device is activated either simultaneously on both sides of the vehicle (in the case of low visibility) or only on one side (the left or right side) of the vehicle during curve driving and/or turning. The side of activation in the latter mode of activation is given by the steering wheel angle or by the turn signal switch. Which of the two particular lighting modes is used, is further controlled by a speed sensor of the motor vehicle.

The advantages of proposed device according to this invention include, among others, using only a single reflector chamber and a single light source without requiring any mechanical rotation of the light assembly to achieve the same function.

Further objects, features and advantages of this invention will become readily apparent to a person skilled in the art after a review of the following description, with reference to the drawings and claims that are appended to and form a part of this specification.

BRIEF DESCRIPTION OF THE DRAWINGS

The preferred, but non-limiting, embodiment of the present invention is described below with reference to the accompanying drawings, in which.

DETAILED DESCRIPTION OF THE PREFERRED EMBODIMENTS

Figure 1:
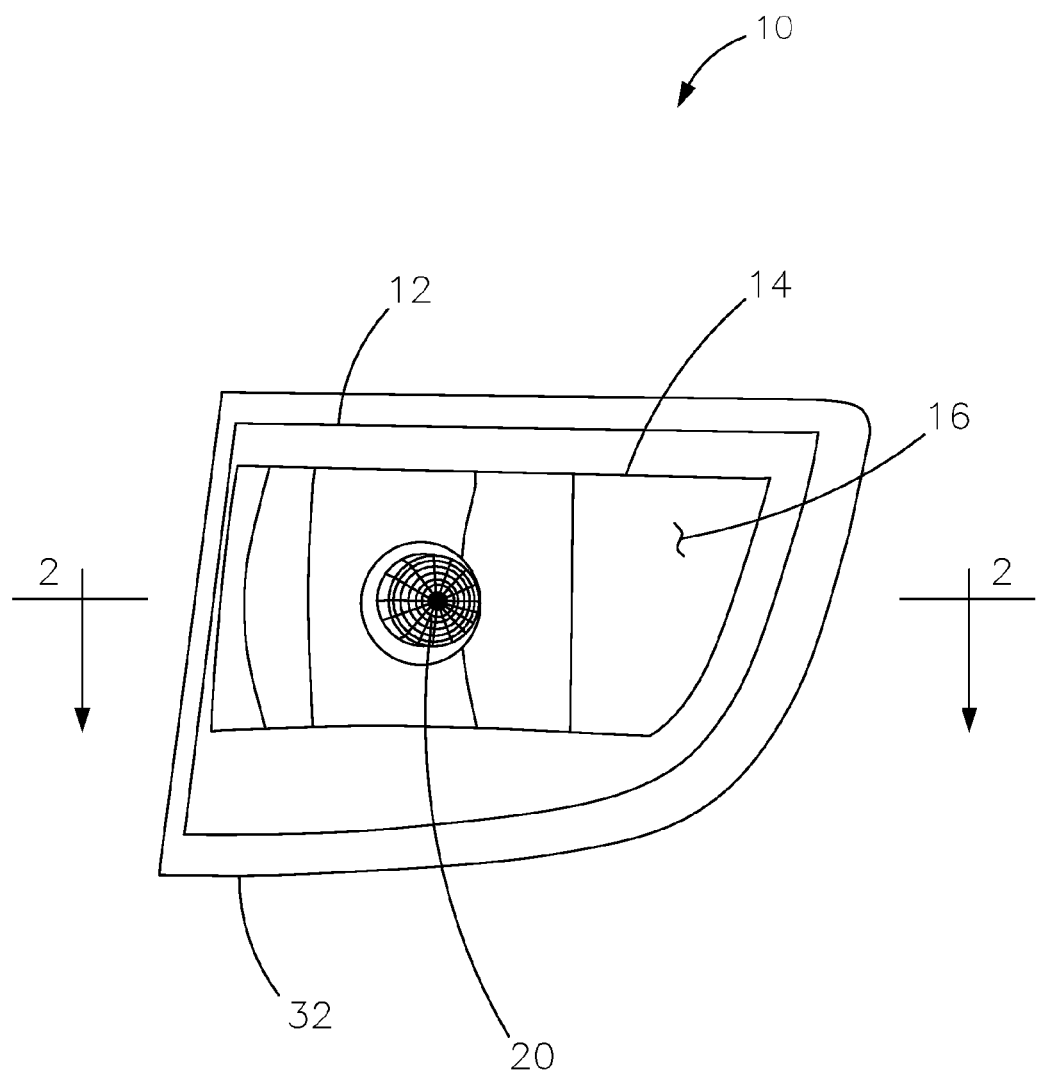
FIG. 1 is a schematic front view of a front side lighting device embodying the principles of the present invention.
Figure 2:
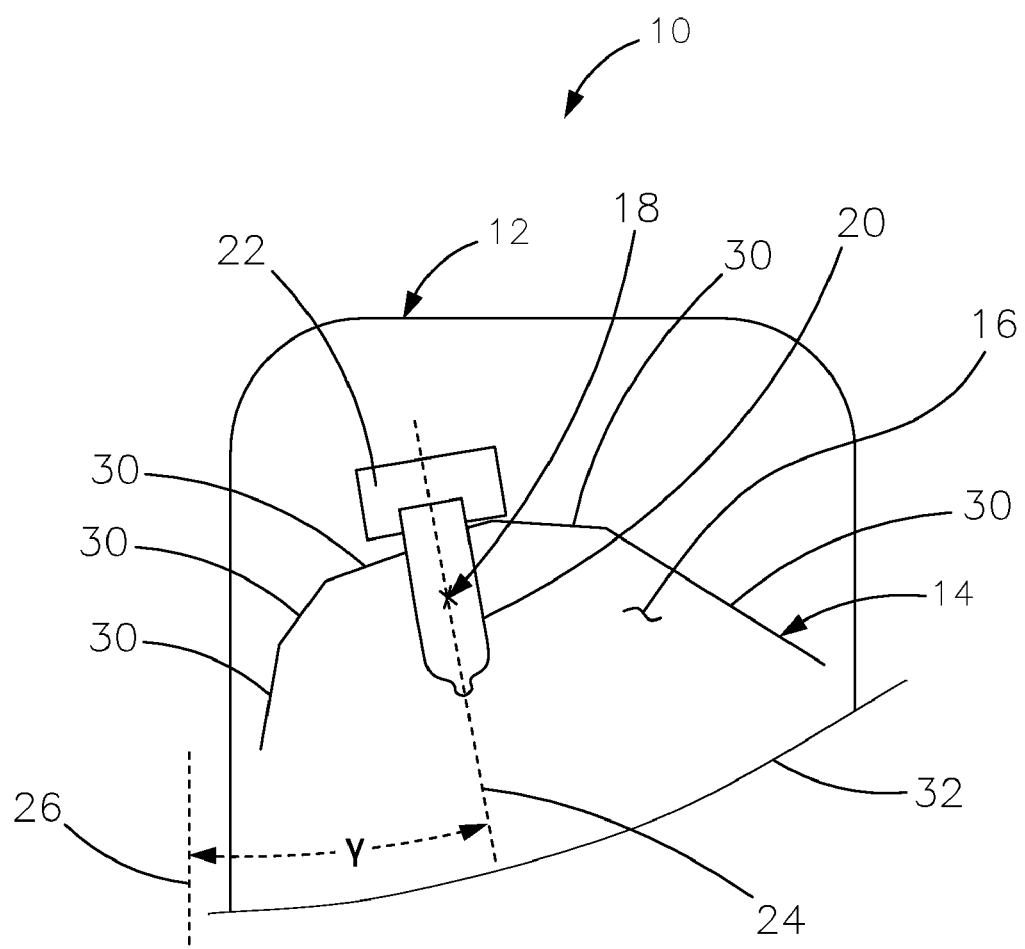
FIG. 2 is a schematic cross-sectional view through the front side lighting device, generally taken along line 2-2 in FIG. 1.

Referring now to the drawings and in particular FIGS. 1 and 2, seen therein is a front side lighting device embodying the principles of the present invention and generally being designated at 10. Contrary to the prior art, the front side lighting device 10 does not employ a mechanical actuator to move or aim the device nor does it employ multiple light chambers each utilizing its own light source. Rather, the front side lighting device 10 is a fixed position, single chamber system.

Figure 3:
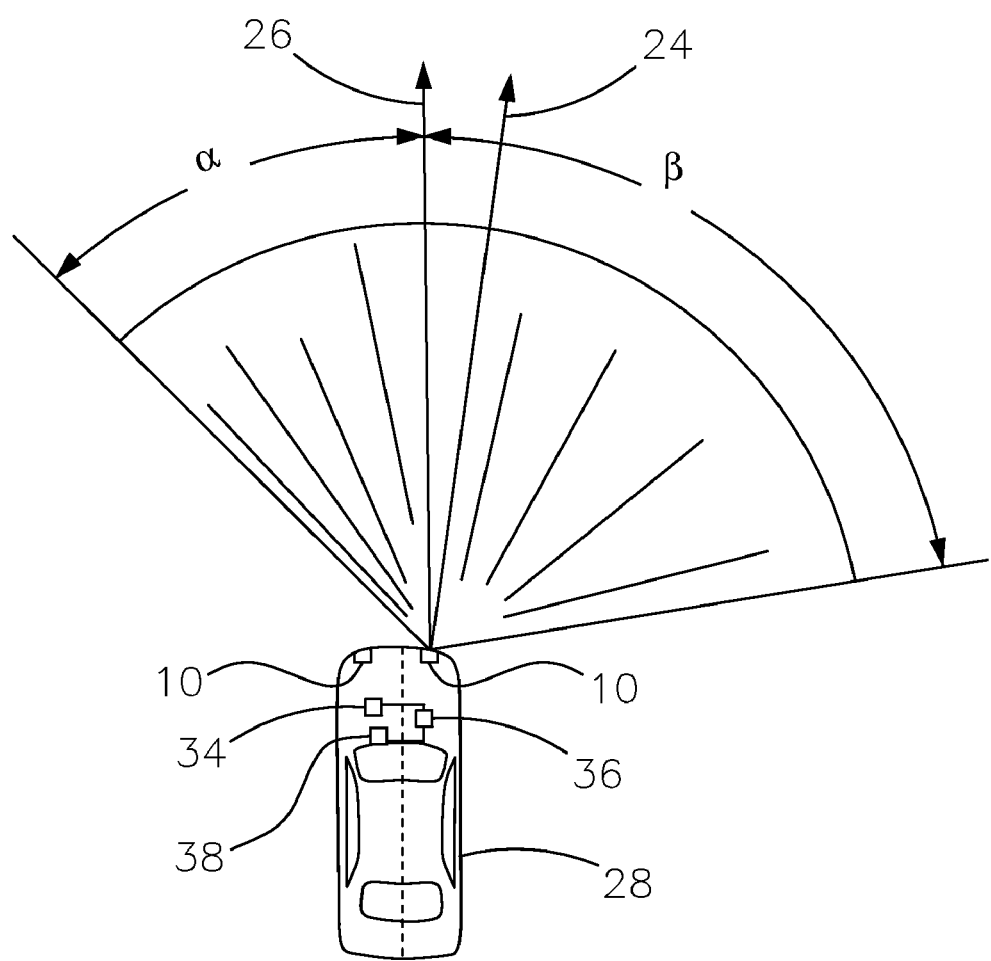
FIG. 3 is a diagrammatic view of the spatial distribution of light produced by a front side lighting device embodying the principles of the present invention.

The front side lighting device 10 includes a plastic housing 12. Within the housing 12, is located a plastic or metal reflector 14 that defines the single chamber 16 of the device 10. Located at the focal point 18 of the reflector 14 is a light source 20. To secure the light source 20 in position within the reflector 14 a socket 22 is mounted to or provided relative to the reflector 14 in a conventional manner. When mounted within the reflector 14, the light source 20 will similarly be positioned along the optical axis 24 of the front side lighting device 10. The light source 20 itself may be of any desired variety including an incandescent bulb or a halogen bulb utilizing a Tungston element, a high pressure discharge tube utilizing a flaming arc, a light emitting diode (LED) or others. As seen in FIG. 2, the optical axis 24 of the reflector 14 and the light source 20 is obliquely oriented with respect to the longitudinal axis 26 of the vehicle 28. As seen in FIG. 3, the optical axis 24 is rotated laterally outward toward the side of the vehicle 28 upon which the front side lighting device 10 is located. The angle between the optical axis 24 of the front side lighting device 10 and the longitudinal axis 26 of the vehicle 28 is generally designated as angle y. The value of the angle y determines the asymmetry of the light beam produced by the front side lighting device 10.

The reflector 14 is provided with a series of facets 30. The facets 30 reflect the light from the light source 20 and the whole spatial light distribution of the front side lighting device 10 is created by the sum of the specific light distributions of the individual facets 30. Preferably, the luminance of the light beam created by the reflector 14 is most intense generally in the direction of the longitudinal axis 26 of the vehicle 28. The whole spatial light distribution of a front side lighting device 10 located on the right hand side of a vehicle 28 is illustrated in FIG. 3. As denoted therein, the whole light spatial distribution is an asymmetrical light distribution where the angle α of the laterally inward or inner horizontal spread of light is less than the angle β of the laterally outward or alter horizontal spread of light. Preferably, the value of the angle α is generally within the range of 15 to 30 degrees and the value of the angle β is generally within the range 45 to 90 degrees.

Completing the assembly of the front side lighting device 10, a smooth lens 32 covers the front of the reflector 14 and housing 12 thereby enclosing the light source 20 within the front side lighting device 10. From the above, use of the front side lighting device allows for a significant portion of light to be placed toward one side of the vehicle relative to the longitudinal axis of the vehicle, during driving in low visibility or poor light conditions. In this mode of operation, front side lighting devices located on both sides of the vehicle 28 are turned on or activated simultaneously. Additionally, a speed sensor in the vehicle may allow the simultaneous use of both a left and right front side lighting device 10 if the speed of the vehicle 28 is below a predetermined set value. The speed sensor 34 would communicate its signal to a controller 36 which would in turn either activate or deactivate the front side lighting devices 10. If the front side lighting devices 10 are turned off at higher speeds, or if deactivated generally, they may be individually activated in response to either a steering wheel angle sensor or a turn signal switch 38. In this instance, they would only be turned on on that side of the vehicle 28 into which the vehicle 28 is turning or is directed along a curve.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined by the following claims

The invention claimed is:

1. A front side lighting device to be placed on each side of the front of a motor vehicle, the device comprising:
   a single light source and a single stationary reflector having an optical axis positioned obliquely to a longitudinal axis of the vehicle, the light source and reflector cooperating to define an asymmetrical light beam having an outer spread and an inner spread defined relative to the longitudinal axis of the vehicle, the angle ($\beta$) of the outer spread being greater than the angle ($\alpha$) of the inner spread, and
   a controller coupled to and configured to activate said light source either on both sides of the vehicle in the case of low visibility in one lighting mode or only on the side of the vehicle during curve driving and turning in another lighting mode, the side of activation being given by one of a steering wheel angle and turn signal switch and the lighting mode being controlled by a speed sensor of the vehicle.

2. The device according to claim 1, wherein the value of angle ($\alpha$) is generally in the range of 15° to 30° and the value of angle ($\beta$) is generally in the range of 45° to 90°.

3. The device according to claim 2, wherein a greatest intensity of luminance is generally in the direction of longitudinal axis (x) of the vehicle.

4. The device according to claim 1, wherein a greatest intensity of luminance is generally in the direction of longitudinal axis (x) of the vehicle.

5. The device according to claim 1, wherein the single light source is one of an incandescent bulb, a halogen bulb or a high-pressure discharge tube.

6. A front side lighting device to be placed on each side of the front of a motor vehicle, the device comprising:
   a single light source and a single stationary reflector having an optical axis positioned obliquely to a longitudinal axis of the vehicle, the light source and reflector defining an asymmetrical light beam having an outer spread and an inner spread defined relative to the longitudinal axis of the vehicle, the angle ($\beta$) of the outer spread being greater than the angle ($\alpha$) of the inner spread.

7. The device according to claim 6, wherein the value of angle ($\alpha$) is generally in the range of 15° to 30° and the value of angle ($\beta$) is generally in the range of 45° to 90°.

8. The device according to claim 7, wherein a greatest intensity of luminance is generally in the direction of longitudinal axis (x) of the vehicle.

9. The device according to claim 6, wherein a greatest intensity of luminance is generally in the direction of longitudinal axis (x) of the vehicle.

10. The device according to claim 6, wherein the single light source is one of an incandescent bulb, a halogen bulb or a high-pressure discharge tube.

* * * * *